United States Patent
Shimizu et al.

(10) Patent No.: US 6,393,023 B1
(45) Date of Patent: May 21, 2002

(54) SYSTEM AND METHOD FOR ACKNOWLEDGING RECEIPT OF MESSAGES WITHIN A PACKET BASED COMMUNICATION NETWORK

(75) Inventors: Takeshi Shimizu, Kanagawa (JP); Wolf-Dietrich Weber, La Honda, CA (US); Patrick J. Helland, Redmond, WA (US); Thomas M. Wicki, Palo Alto; Winfried W. Wilcke, San Jose, both of CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/075,461

(22) Filed: May 8, 1998

(51) Int. Cl.[7] .............................. H04L 12/56; H04J 3/16
(52) U.S. Cl. ...................................... 370/389; 370/469
(58) Field of Search ................................ 370/351, 352, 370/389, 392, 397, 399, 400, 401, 402, 419, 426, 428, 421, 448, 465, 445, 452, 466–469; 709/219, 230, 231, 232, 235, 237, 238, 200, 205

(56) References Cited

U.S. PATENT DOCUMENTS

| | | | | | |
|---|---|---|---|---|---|
| 4,747,100 A | * | 5/1988 | Roach | .................... | 370/452 |
| 5,077,732 A | * | 12/1991 | Fischer | .................... | 370/400 |
| 5,862,326 A | * | 1/1999 | Bapat | .................... | 709/230 |
| 5,903,724 A | * | 5/1999 | Takamoto et al. | .................... | 709/230 |
| 5,951,648 A | * | 9/1999 | Kailash | .................... | 709/237 |
| 5,959,995 A | * | 9/1999 | Wicki | .................... | 370/400 |

* cited by examiner

Primary Examiner—Huy D. Vu
Assistant Examiner—Steven Nguyen
(74) Attorney, Agent, or Firm—Carr & Ferrell LLP

(57) ABSTRACT

A system and method for acknowledging receipt of messages within a packet based communication network. A sending node generates a data packet within an upper layer, and transmits the data packet to a receiving node using a lower layer. The lower layer generates and transmits a pseudo reply packet to the upper layer in response to an acknowledgment received from the receiving node. The pseudo reply packet notifies the upper layer of the sending node that the receiving node successfully received the data packet and removes the burden of having an upper layer of the receiving node generate an actual reply packet.

17 Claims, 6 Drawing Sheets

SYSTEM AND METHOD FOR ACKNOWLEDGING RECEIPT OF MESSAGES WITHIN A PACKET BASED COMMUNICATION NETWORK

CROSS-REFERENCE TO RELATED APPLICATIONS

This application relates to co-pending U.S. patent application Ser. No. 08/605,677, entitled "Asynchronous Packet Switching," filed on Feb. 22, 1996.

BACKGROUND OF THE INVENTION

1. Field of the Invention

The present invention relates generally to packet based communications networks, and more particularly for acknowledging receipt of messages within a packet based communication network.

2. Discussion of Background Art

Packets are widely used for communications between nodes in a computer system. Messages are reliably passed using a combination of packet re-transmissions and acknowledgments upon receipt. Typically a node sending a packet to a receiving node keeps a copy of the packet in a temporary buffer and intermittently transmits it again and again until an acknowledgment comes back from the receiving node. A popular model for dividing up communications responsibility is called the International Standards Organization/Open System Interconnection (ISO/OSI) Model. The ISO/OSI Model divides the data communication task between the following seven different layers: an Application Layer, a Presentation Layer, a session layer, a Transport Layer, a Network Layer, a Data-Link Layer, and a Physical Layer.

Depending upon the particular protocols implemented within these layers, an upper layer (i.e. one of the layers above the Transport Layer) from a sending node may need confirmation that a receiving node received a data packet. Typically the upper layer must explicitly generate a request to an upper layer in the receiving node for a standard reply packet, confirming that the receiving node received the data packet. Such a request requires that a corresponding upper layer on the receiving node generate a reply packet and then send the reply back through the communications network. This entire request and reply procedure increases the network's fan-out and round trip latency (i.e. delay). Fan-out is the number of data packets required to be transmitted across a network so as to effect a single data communications transaction. The higher fan-out of a traditional request and reply protocol increases the bandwidth requirements of the communications network and places an additional burden on the computational resources of both the sending node and the receiving node, diverting these resources from more productive uses.

What is needed is an improved system and method for acknowledging receipt of messages within a packet based communication network.

SUMMARY OF THE INVENTION

The present invention is a system and method for acknowledging receipt of messages within a packet based communication network. Within the system of the present invention, a sending node generates a data packet within an upper layer, and transmits the data packet to a receiving node using a lower layer. The lower layer then generates and transmits a pseudo reply packet to the upper layer in response to an acknowledgment received from the receiving node. The pseudo reply packet notifies the upper layer of the sending node that the receiving node successfully received the data packet and removes the burden of having the upper layer of the receiving node generate a standard reply packet. By removing this burden, network bandwidth and latency are reduced, and fewer network resources are required.

In another aspect of the invention, the lower layer of the sending node includes a buffer for storing the data packets, from which the pseudo reply packets are generated.

Within the method of the present invention, a copy of a data packet to be sent from a sending node to a receiving node is stored in a buffer within a lower layer before being sent to the receiving node. The lower layer in the sending node, upon receiving an acknowledgement packet, generates a pseudo reply packet using the data packet stored in the buffer. This pseudo reply packet is then sent to an upper layer within the sending node. As a result, the upper layer of the receiving node need not generate a standard reply packet, thus reducing network latency and bandwidth requirements.

These and other aspects of the invention will be recognized by those skilled in the art upon review of the detailed description, drawings, and claims set forth below.

DETAILED DESCRIPTION OF THE PREFERRED EMBODIMENT

Figure 1:
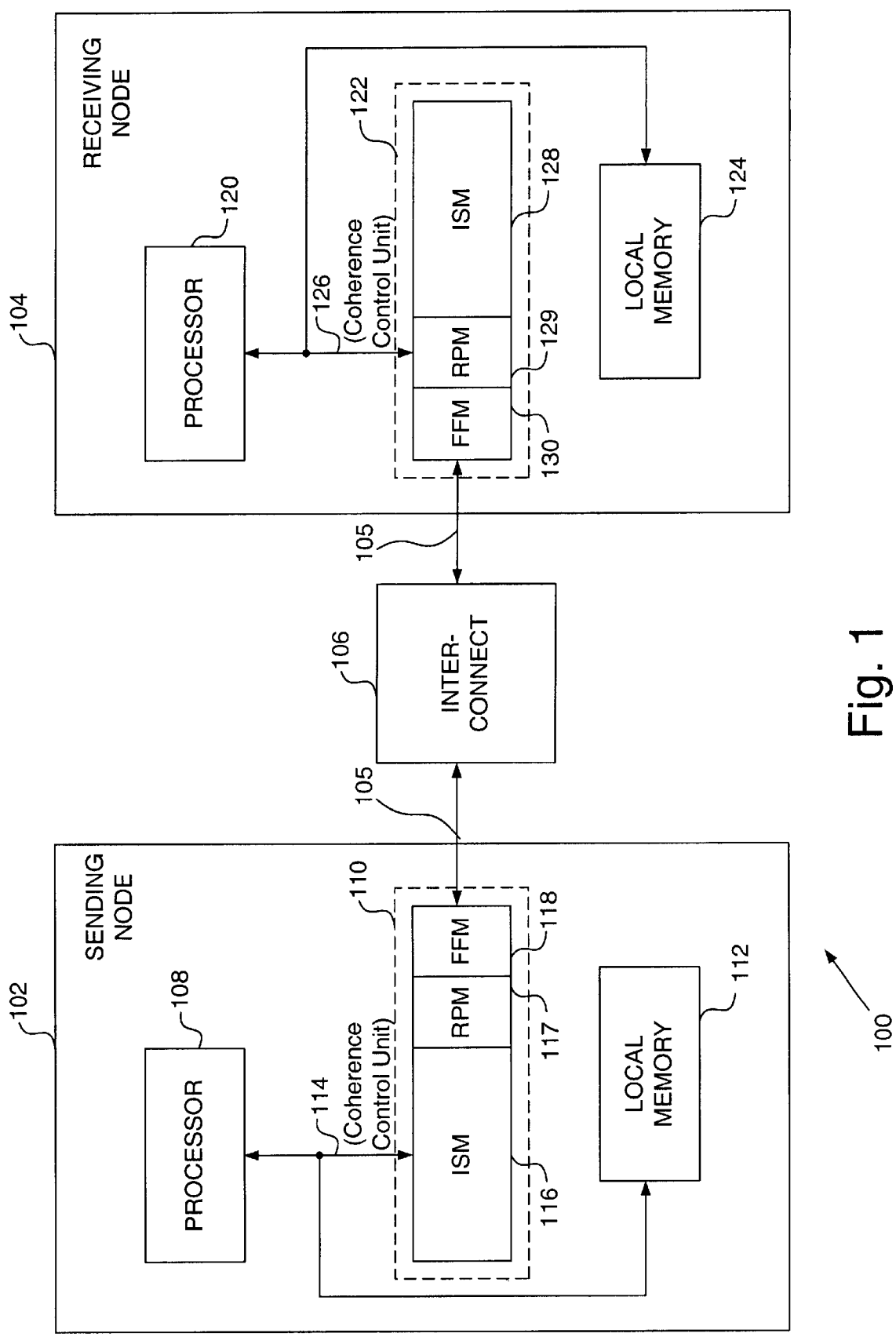
FIG. 1 is a block diagram of a system for acknowledging receipt of messages within a packet based communication network.

FIG. 1 is a block diagram of a system 100 for acknowledging receipt of messages within a packet based communication network. The system 100 includes a sending node 102 and a receiving node 104 each coupled by a mesh link 105 to an interconnect 106. A node is labeled as the sending node 102 when it originates a packet to be sent over the network. A node is labeled as the receiving node 104 when it is a destination for a packet sent over the network. The same physical node may thus be labeled either the sending node or the receiving node depending upon the functions it is performing. While only two nodes are shown in FIG. 1, many nodes may be added to the interconnect network.

The sending node 102 includes a processor 108, a coherence control unit 110, and a local memory 112, each coupled to a bus 114. The coherence control unit 110 includes an interconnect service manager (ISM) 116, a reliable packet mover (RPM) 117, and a fast frame mover (FFM) 118. The ISM 116 communicates with other ISMs (ex. ISM 128) using point-to-point messages. The RPM 117 provides reliable end-to-end data communication between the sending node 102 and the receiving node 104. The FFM 118 routes data from the sending node 102 to the receiving node 104. The local memory 112 stores computer program instructions for controlling how the processing unit 108 accesses, transforms and outputs data. The local memory 112 includes both a volatile and a non-volatile portion. Those skilled in the art will recognize that the local memory 112 may be supplemented with other computer use able storage media, including a compact disk, a magnetic drive or a dynamic random access memory.

The receiving node 104 includes a processor 120, a coherence control unit 122, and a local memory 124, each coupled to a bus 126. The coherence control unit 122 includes an interconnect service manager (ISM) 128, a reliable packet mover (RPM) 129, and a fast frame mover (FFM) 130. The processor 120, the ISM 128, the RPM 129, the FFM 130 and the local memory 124 each perform the same functions as described for the sending node 102. Other node architectures may be used. For example, the coherence control units 110, 122 may be coupled to a cache memory, which is coupled to each processor 108, 120.

The interconnect 106 is designed to enable a plurality of nodes to communicate with each other. The interconnect 106 includes a plurality of routers connected by mesh links 105. The routers are preferably cross bar switches. If the network only includes a few nodes, the interconnect 106 need only include one router. If the network only includes two nodes, a router need not even be included. The interconnect 106 uses a packet based protocol in which all communication is directly passed from the sending node 102 to the receiving node 104. The interconnect 106 need not provide multicast or broadcast capability.

The bandwidth of the link between the coherence control units 110, 122 and the local memories 112, 124 is preferably substantially equal to the bandwidth of the link between the coherence control units 110, 122 and the interconnect 106.

Figure 2:
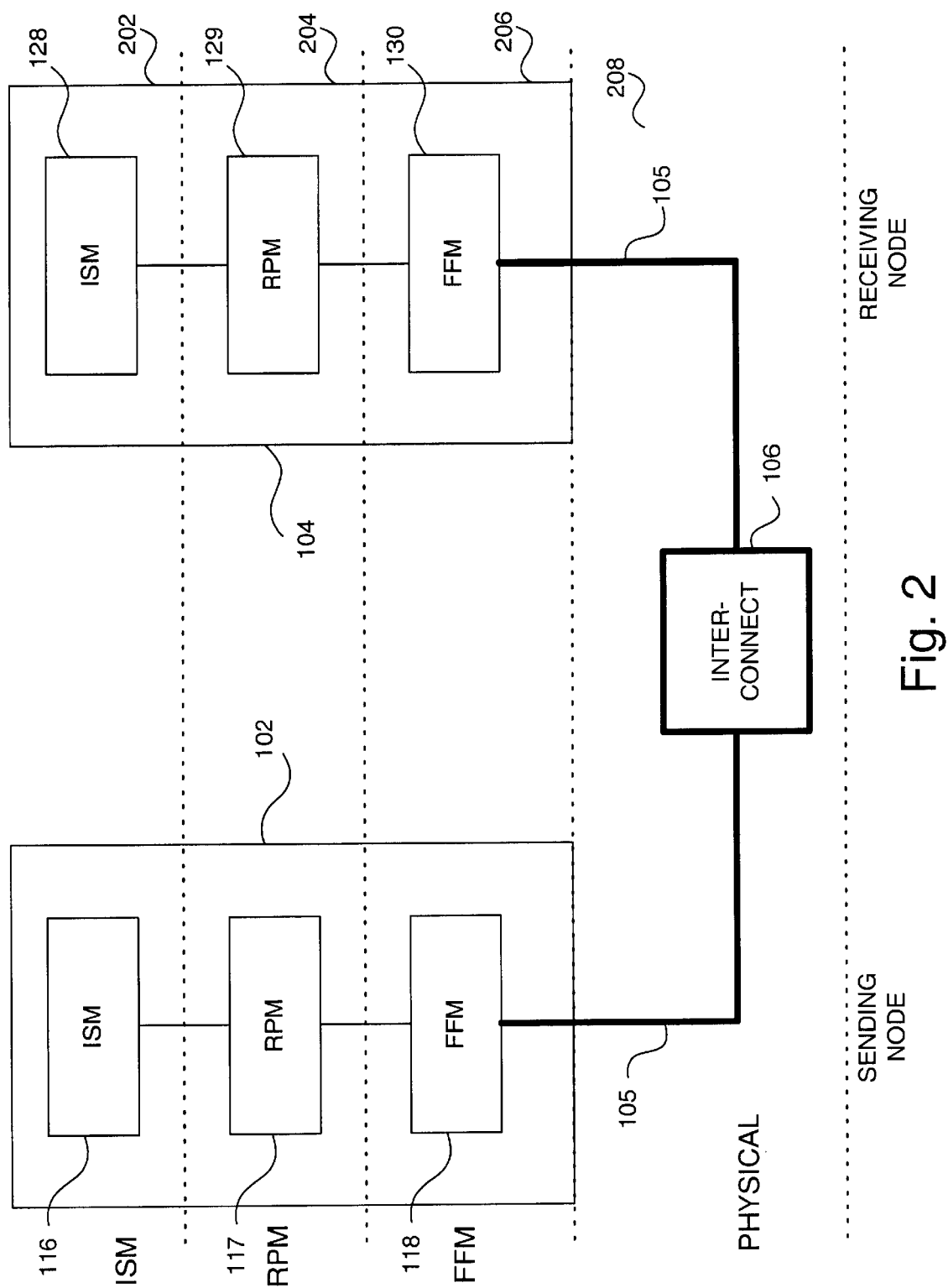
FIG. 2 is a block diagram illustrating protocol layers of the system of FIG. 1.

FIG. 2 is a block diagram illustrating protocol layers of the system of FIG. 1. The protocol layers include an ISM layer 202 within which the ISMs 116, 128 function, an RPM layer 204 within which the RPMs 117, 129 function, an FFM layer 206 within which the FFMs 118, 130 function, and a physical layer 208 within which the interconnect 106 resides. The software executed by the processors 108, 120 control the ISM, RPM, and FFM units 116, 128, 117, 129, 118, 130, and a portion of the interconnect 106. When the ISM unit 116 sends data to or requests data from the receiving node 104, the ISM unit 116 sends commands to its RPM 117 that informs the RPM 117 of the data to be sent or requested and the source or destination of the data.

At the RPM layer 204, the sending node 102 sends data packets to the receiving node 104, without having to determine the path through the interconnect 106 or use any information regarding the path. The RPM layer 204 provides reliable delivery of data packets between the nodes 102, 104 by using the FFM layer 206 to transmit the packets. Within the RPM layer 204, the RPM 117 sends data and monitors the receiving node 104 for an acknowledgment packet indicating that the data packet was received. If such an acknowledgement is not received within a time-out period, the RPM 117 resends data packet. Thus, the RPM layer 204 resends data packets that have been lost or corrupted during transmission. The RPM layer 204 also suppresses duplicate data packets and reorders data packets that are received out of order. At the RPM layer 204, packets are sent directly from the sending node 102 to the receiving node 104 instead of being multicast or broadcast. If, however, a packet is to be sent to more than one receiving node 104, the ISM unit 116 individually sends separate copies of the packet to each of the receiving nodes 104. The RPM layer's 204 functions are preferably implemented in hardware, not software.

At the FFM layer 206, the communication is point-to-point between directly connected elements (i.e., the nodes 102, 104 and the routers within the interconnect 106). A frame is sent from the sending node 102 through a router in the interconnect 106 to other routers and then to the receiving node 104. The FFM layer 206 provides flow control on each step between neighboring elements (i.e. the routers and the nodes 102, 104). The FFM layer 206 also provides the route to connect these steps together thereby transmitting frames from one node to another. The FFM layer 206 performs simple integrity checking on only the portion of the frame that it uses. Since the FFM 206 does not provide error correction, if an error occurs, the FFM layer 206 discards the frame, and, at a later time, the RPM 117 of the sending node 102 resends the data packet. The FFM layer 206 is stream-lined for low latency by not performing error detection for each frame and by dropping bad frames.

The physical layer 208 includes the cabling, connectors, and the like of the interconnect 106 and the interface to the processor nodes 102, 104.

Figure 3:
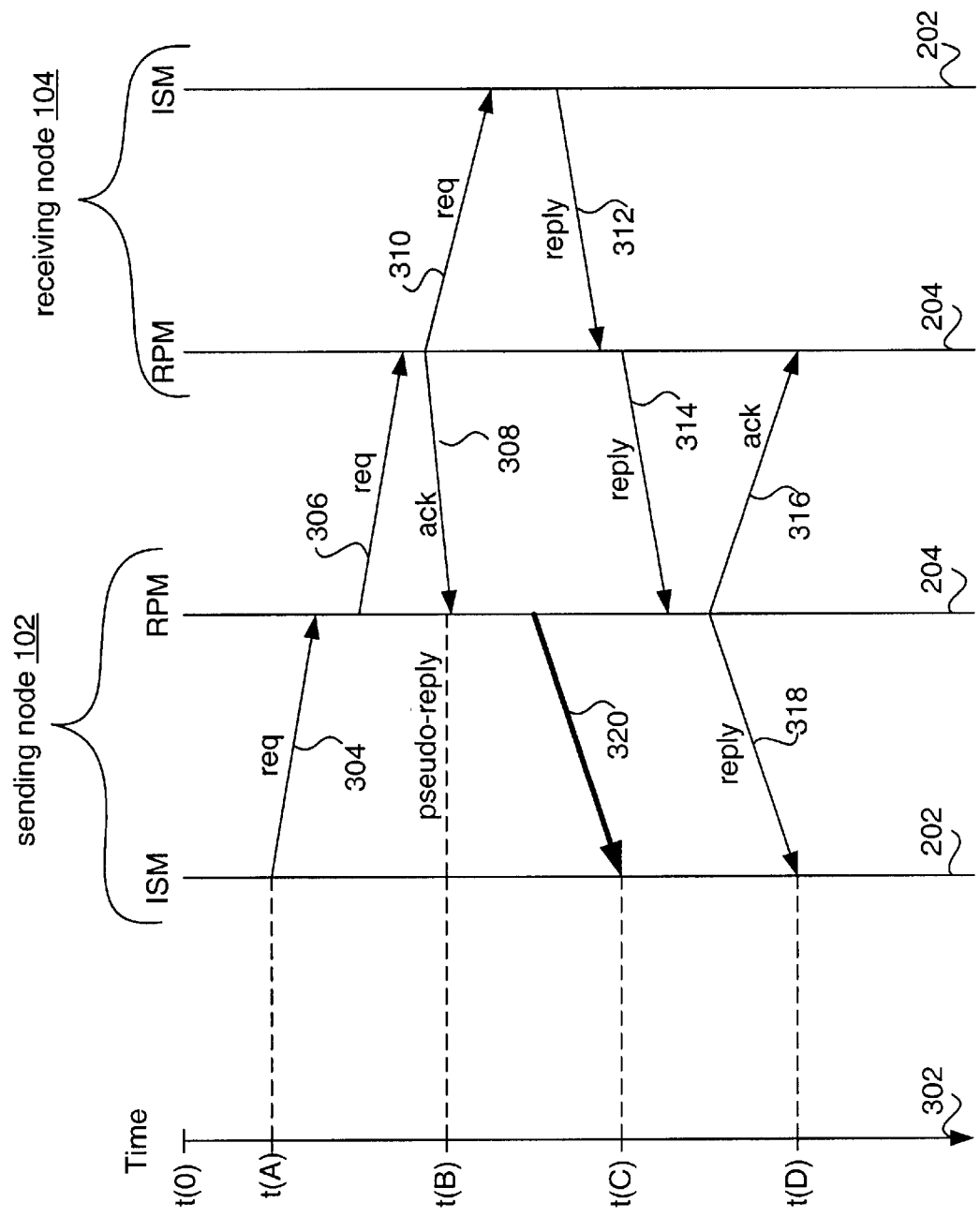
FIG. 3 is a timing diagram for an interconnect service manager (ISM)-level request and reply in the system of FIG. 1.

FIG. 3 is a timing diagram for an ISM-level request and reply in the system of FIG. 1. A time axis 302 begins in the upper left at time $t_0$. At time $t_A$ the ISM unit 116 generates a request packet and passes it to the RPM layer 204 of the sending node 102, as shown by segment 304. The RPM layer 204 of the sending node transmits the request via the FFM, shown by segment 306, to the receiving node 104 while a copy of the packet is stored in a temporary "transmission buffer". The transmission buffer is preferably located within the RPM 117, but may alternatively be located within the local memory 112. The RPM layer 204 of the sending node 102 retransmits the request intermittently until a corresponding acknowledgment packet, shown by segment 308, is received from the receiving node 104. The RPM layer 204 at the receiving node 104 generates the acknowledgment if the request packet is received without error and in order.

The ISM unit 116 has previously decided how such acknowledgements are to be handled by the RPM layer 204. Three scenarios are possible. In a first scenario, the RPM 117 deallocates the transmission buffer and no additional packets are sent within either of the nodes 102, 104 or between the nodes 102, 104. While the first scenario completes the transmission process at time $t_B$, the ISM unit 116 cannot tell whether the request packet has arrived at the receiving node 104 or not.

In a second scenario, the RPM 117 deallocates the transmission buffer after receiving the acknowledgment, shown by segment 308. The RPM layer 204 of the receiving node 104, upon receiving the request shown by segment 306, sends the request, shown by segment 310, to the ISM layer 202 of the receiving node 104. In response, the ISM layer 202 of the receiving node 104 sends a reply packet, shown by segment 312, to the RPM layer 204 of the receiving node 104. The RPM layer 204 of the receiving node 104 then transmits the reply packet, shown by segment 314, to the RPM layer 204 of the sending node 102. The RPM layer 204 of the sending node 102 generates an acknowledgment, shown by segment 316, in response and also passes the reply packet, shown by segment 318, on to the ISM unit 116. The second scenario completes the transmission process at time $t_D$, and requires five more packet transmissions (ref. segments 310, 312, 314, 316, and 318).

In a third scenario, called "Certified Delivery," instead of deallocating the transmission buffer after the acknowledgement, shown by segment 308, is received, the RPM layer 204 of the sending node 102 generates and sends a pseudo reply packet, shown by segment 320, to the ISM unit 116. The pseudo reply packet is generated using the request packet stored in the transmission buffer. More specifically, the request packet itself is returned to the sending ISM 116 with an indication that this packet was reliably delivered. As a result, at time $t_C$ the ISM unit 116 receives notification that the request packet was successfully received at the receiving node 104 and thus the ISM layer 202 of the sending node 102 can assume that the ISM layer 202 of the receiving node 104 is processing the request.

The third scenario is preferred over the first scenario since the ISM unit 116 actually receives confirmation of a successful request packet transmission. The third scenario is preferred over the second scenario since the third scenario significantly reduces the time it takes for the sending ISM 116 to receive a reply (known as network latency). The network latency is reduced since the ISM layer 202 of the receiving node 104 need not generate a standard reply packet. This is shown in FIG. 3 where the ISM unit 116 receives the pseudo reply packet at the earlier time $t_C$, instead of receiving the standard reply packet at a later time $t_D$.

The third scenario is also preferred over the second scenario since the third scenario significantly reduces the network's bandwidth requirements. Bandwidth is the transmission capacity of a computer and/or a communications channel, and a network requires a larger bandwidth when a larger number of packets must be transmitted between nodes. Using the third scenario, a reply packet is received after only four packet transmissions, as shown by segments 304, 306, 308, and 320, instead of eight packet transmissions, as shown by segments 304, 306, 308, 310, 312, 314, 316, and 318. Thus since four fewer packet transmissions are required when the third scenario is chosen the network's bandwidth requirements are reduced.

The third scenario is lastly preferred over the second scenario since the third scenario significantly reduces the network's resource requirements. In the second scenario, the ISM layer 202 of both the sending node 102 and the receiving node 104 must have a mechanism for avoiding a protocol level deadlock by providing enough resources for all transactions within each ISM layer 202. Protocol deadlock occurs when two programs or devices are each waiting for a signal from the other before they can continue. However, using the third scenario, resources at the receiving node's 104 ISM layer 202 are not consumed when the pseudo reply packet is generated by the sending node's 102 RPM layer 204. Thus the maximum number of packets caused by a transaction (i.e. the fan-out) is reduced, and the total amount of resource for deadlock avoidance is also reduced.

Figure 4:
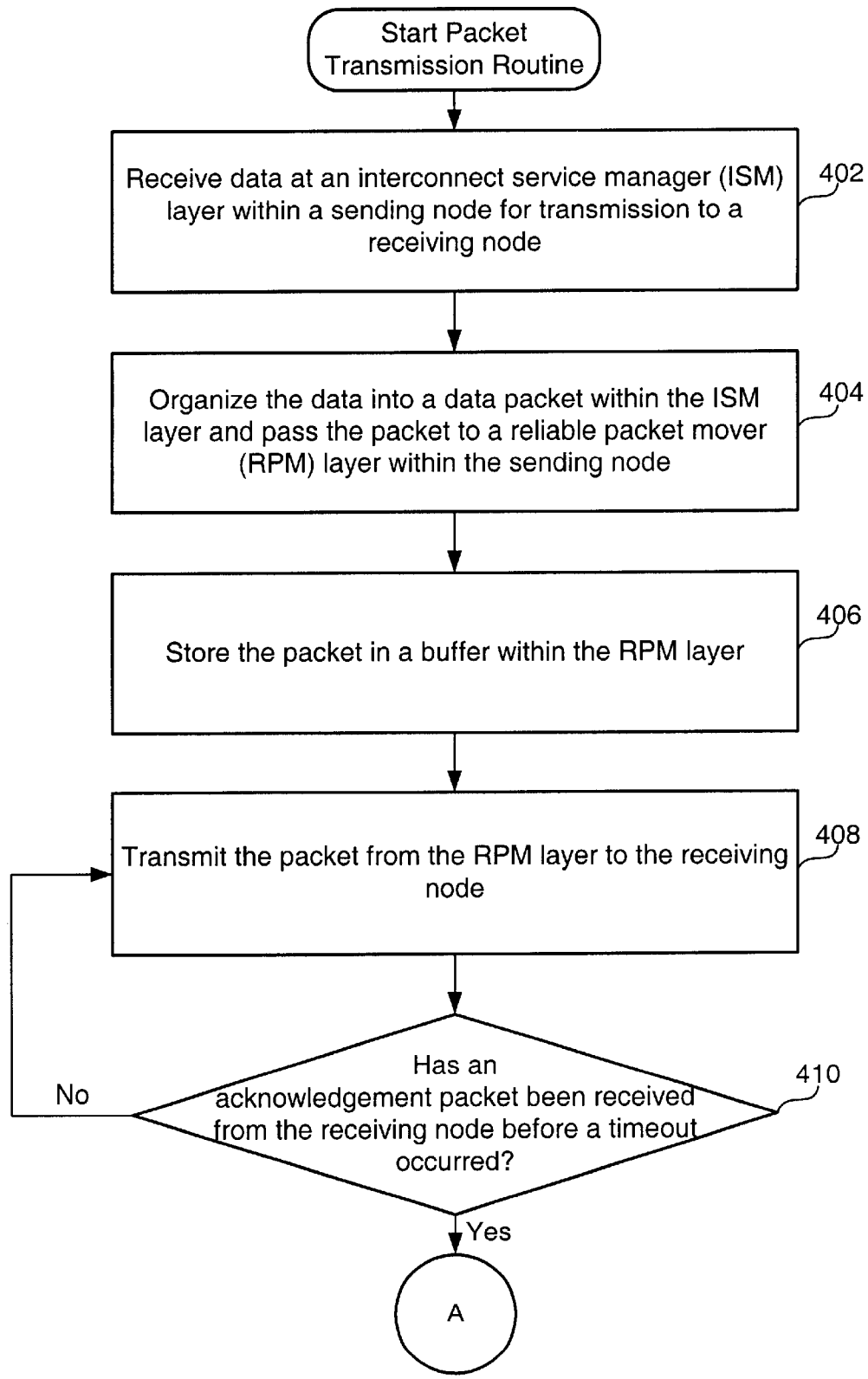
FIGS. 4 and 5 are a flowchart for transmitting data packets.
Figure 5:
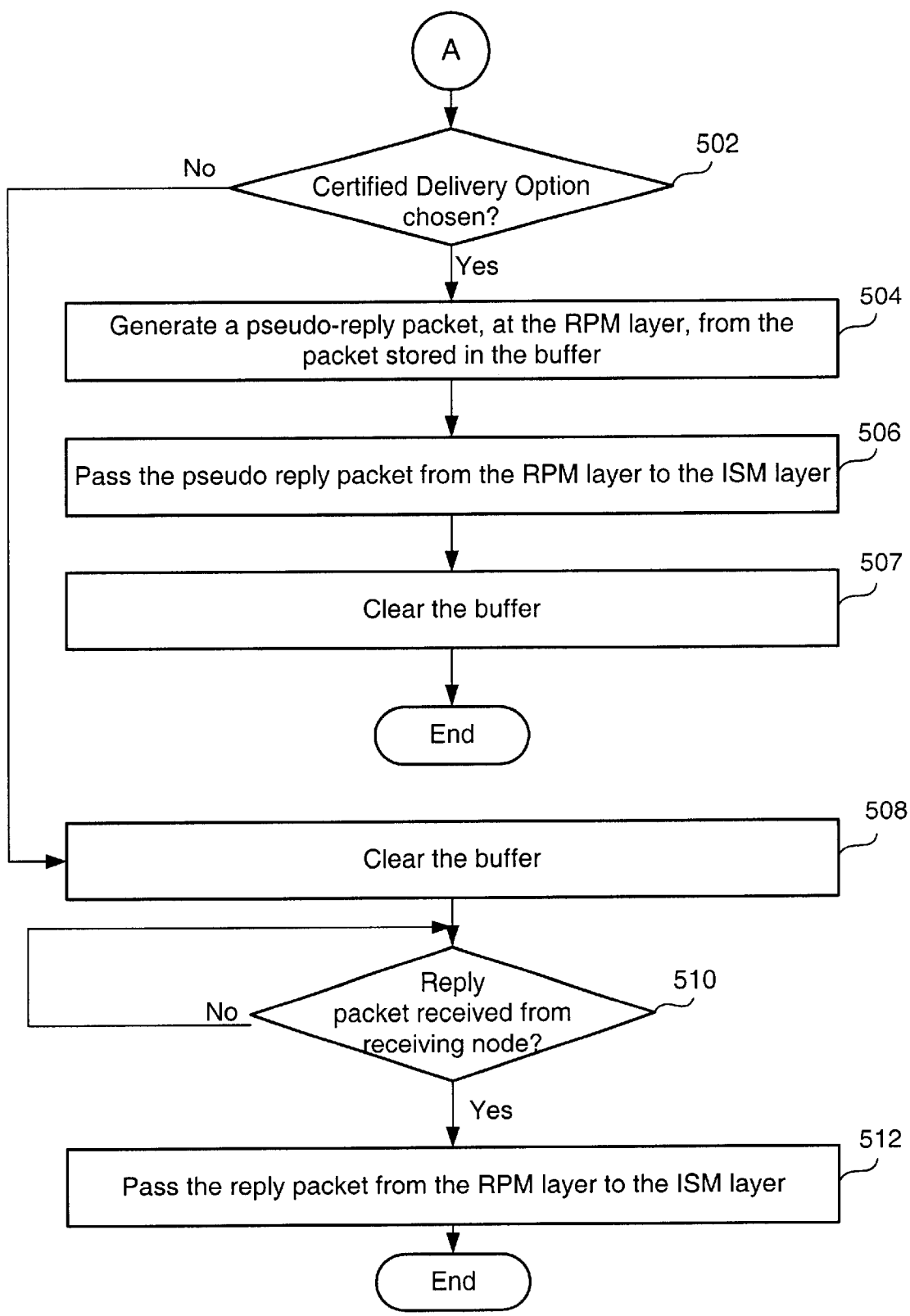

FIGS. 4 and 5 are a flowchart for transmitting data packets. The method begins in step 402 where the ISM layer 202 within the sending node 102 receives data for transmission to the receiving node 104. Next in step 404, the ISM layer organizes the data into a data packet and passes the packet to the RPM layer 204 within the sending node 102. The RPM layer stores the packet in the transmission buffer within the RPM layer, in step 406. In step 408, the RPM layer transmits the packet to the receiving node 104. Next in step 410, if an acknowledgement packet has been received from the receiving node 104 before a timeout occurs the method proceeds to step 502, else the method returns to step 408. In step 502, if the certified delivery option is chosen, the method proceeds to step 504, else the method proceeds to step 508. The RPM layer within the sending node 102 generates a pseudo-reply packet from the packet stored in the buffer, in step 504. In step 506, the RPM layer within the sending node 102 passes the pseudo reply packet from the RPM to the ISM layer in the sending node 102. After step 506, the buffer is cleared in step 507 and the method ends. In step 508, the RPM layer of the sending node 102 clears the buffer. Next in step 510, if a reply packet is received by the sending node 102 from the receiving node 104, the method proceeds to step 512, else the method returns to step 510. The RPM layer in the sending node 102 passes the reply packet to the ISM layer in the sending node. After step 512, the method for packet transmissions ends.

Figure 6:
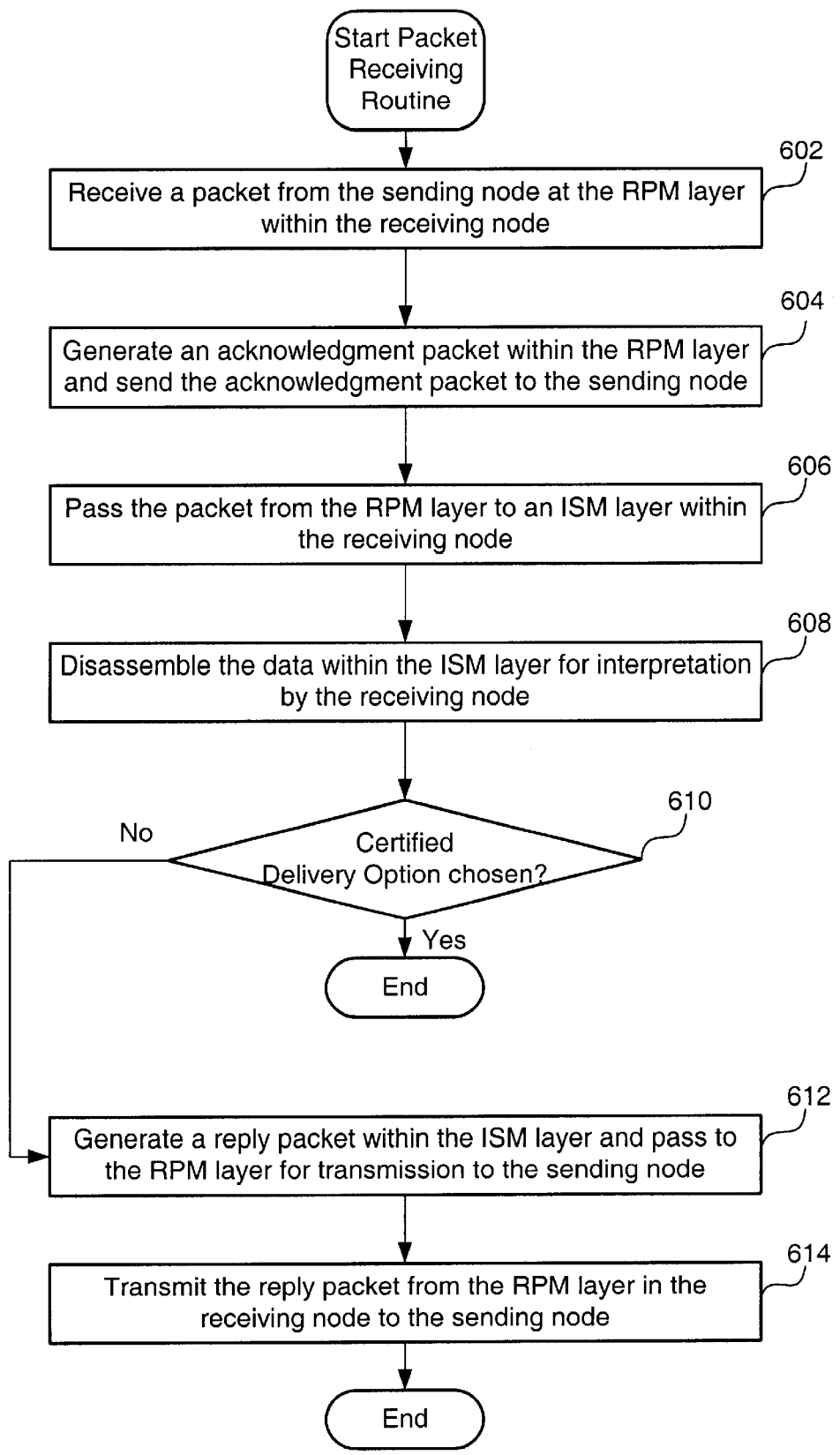
FIG. 6 is a flowchart for receiving data packets.

FIG. 6 is a flowchart for receiving data packets. The method begins in step 602 where the RPM layer 204 within the receiving node 104 receives a request packet from the sending node 102. Next in step 604, the RPM layer generates and sends an acknowledgment packet to the sending node 102. The RPM layer passes the request packet to the ISM layer within the receiving node 104, in step 606. In step 608, the ISM layer within the receiving node 104 disassembles the data within the request packet for interpretation. Next in step 610, if the certified delivery option is chosen, the method ends, else the method proceeds to step 612. The ISM layer within the receiving node 104 generates a reply packet which is passed to the RPM layer for transmission to the sending node 102, in step 612. In step 614, the RPM layer transmits the reply packet to the sending node. After step 614, the method for packet receiving ends.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A method for acknowledging receipt of messages within a packet based communication network, comprising the steps of:

indicating whether delivery is to be certified;

storing a data packet in a buffer at a sending node;

transmitting the data packet from the sending node to a receiving node;

receiving an acknowledgement from the receiving node;

retrieving the data packet from the buffer when the acknowledgment is received; and generating a pseudo reply packet from the retrieved data packet within the sending node in response to the acknowledgement, if delivery is to be certified.

2. The method of claim 1 further including the steps of:

creating the data packet within an upper layer of the sending node;

passing the data packet from the upper layer to a lower layer of the sending node;

wherein, the transmitting step includes transmitting the data packet from the lower layer to the receiving node; and the steps of storing, retrieving, and generating are effected by the lower layer; and passing the pseudo reply packet from the lower layer to the upper layer, whereby the upper layer interprets the pseudo reply packet as information that the data packet was successfully received by the receiving node.

3. The method of claim 1 further comprising the steps of:

receiving the data packet at the receiving node;

transmitting the acknowledgment to the sending node; and preventing the receiving node from generating a standard reply packet, if delivery is to be certified, whereby resources of the receiving node are conserved.

4. The method of claim 1 wherein:

if delivery is to be certified, the receiving node does not generate a standard reply packet.

5. An apparatus for acknowledging receipt of messages within a packet based communication network, comprising:

means for indicating whether delivery is to be certified;

means for storing a data packet in a buffer at a sending node;

means for transmitting the data packet from the sending node to a receiving node;

means for receiving an acknowledgement from the receiving node;

means for retrieving the data packet from the buffer when the acknowledgement is received; and means for generating a pseudo reply packet from the retrieved data packet within the sending node in response to the acknowledgement, if delivery is to be certified.

6. The apparatus of claim 5 further including:

means for creating the data packet within an upper layer of the sending node;

means for passing the data packet from the upper layer to a lower layer of the sending node;

wherein, the means for transmitting includes means for transmitting the data packet from the lower layer to the receiving node; and the means for storing, retrieving, and generating are included in the lower layer; and means for passing the pseudo reply packet from the lower layer to the upper layer, whereby the upper layer interprets the pseudo reply packet as information that the data packet was successfully received by the receiving node.

7. The apparatus of claim 5 further comprising:

means for receiving the data packet at the receiving node;

means for transmitting the acknowledgment to the sending node; and means for preventing the receiving node from generating a standard reply packet, if delivery is to be certified, whereby resources of the receiving node are conserved.

8. The apparatus of claim 5 wherein:

if delivery is to be certified, the receiving node does not generate a standard reply packet.

9. A computer-useable medium embodying computer program code for causing a computer to acknowledge receipt of messages within a packet based communication network, by performing the steps of:

indicating whether delivery is to be certified;

storing a data packet in a buffer at a sending node;

transmitting the data packet from the sending node to a receiving node;

receiving an acknowledgement from the receiving node;

retrieving the data packet from the buffer when the acknowledgement is received; and generating a pseudo reply packet from the retrieved data packet within the sending node in response to the acknowledgement, if delivery is to be certified.

10. The computer-useable medium of claim 9 further embodying computer program code for causing a computer to perform the steps of:

creating the data packet within an upper layer of the sending node;

passing the data packet from the upper layer to a lower layer of the sending node;

wherein, the transmitting step includes transmitting the data packet from the lower layer to the receiving node; and the lower layer performs the steps of storing, retrieving, and generating; and passing the pseudo reply packet from the lower layer to the upper layer, whereby the upper layer interprets the pseudo reply packet as information that the data packet was successfully received by the receiving node.

11. The computer-useable medium of claim 9 further embodying computer program code for causing a computer to perform the steps of:

receiving the data packet at the receiving node;

transmitting the acknowledgment to the sending node; and preventing the receiving node from generating a standard reply packet, if delivery is to be certified, whereby resources of the receiving node are conserved.

12. The computer-usable medium of claim 9 wherein:

if delivery is to be certified, the receiving node does not generate a standard reply packet.

13. A system for acknowledging receipt of messages within a packet based communication network, comprising:

a sending node having an upper layer for generating a data packet and for indicating whether delivery is to be certified, a buffer for storing the data packet, and a lower layer, coupled to the upper layer, for transmitting the data packet and, if delivery is to be certified, for retrieving the data packet from the buffer to generate a pseudo reply packet and for transmitting the pseudo reply packet to the upper layer in response to an acknowledgment.

14. method for acknowledging receipt of messages within a packet based communication network, comprising the steps of:

storing a data packet in a buffer at a sending node;

transmitting the data packet from the sending node to a receiving node;

receiving an acknowledgement from the receiving node; and generating a pseudo reply packet from the stored data packet within the sending node in response to the acknowledgement, thereby freeing the receiving node from having to generate a standard reply packet.

15. An apparatus for acknowledging receipt of messages within a packet based communication network, comprising:

means for storing a data packet in a buffer at a sending node;

means for transmitting the data packet from the sending node to a receiving node;

means for receiving an acknowledgement from the receiving node; and means for generating a pseudo reply packet from the stored data packet within the sending node in response to the acknowledgement, thereby freeing the receiving node from having to generate a standard reply packet.

16. A computer-useable medium embodying computer program code for causing a computer to acknowledge receipt of messages within a packet based communication network, by performing the steps-of:
- storing a data packet in a buffer at a sending node;
- transmitting the data packet from the sending node to a receiving node;
- receiving an acknowledgement from the receiving node; and
- generating a pseudo reply packet from the stored data packet within the sending node in response to the acknowledgement, thereby freeing the receiving node from having to generate a standard reply packet.

17. A system for acknowledging receipt of messages within a packet based communication network, comprising:
- a sending node having
  - an upper layer for generating a data packet, and
  - a lower layer, coupled to the upper layer, for storing and transmitting the data packet, and for generating a pseudo reply packet based upon the stored data packet and transmitting the pseudo reply packet to the upper layer in response to an acknowledgment.

* * * * *